United States Patent
Hoshihara et al.

(10) Patent No.: US 6,959,900 B2
(45) Date of Patent: Nov. 1, 2005

(54) POWERED SLIDING APPARATUS FOR A SEAT

(75) Inventors: Naoaki Hoshihara, Obu (JP); Sadao Ito, Anjo (JP); Genta Moriyama, Anjo (JP); Hideo Nihonmatsu, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 209 days.

(21) Appl. No.: 10/226,281

(22) Filed: Aug. 23, 2002

(65) Prior Publication Data

US 2003/0052246 A1 Mar. 20, 2003

(30) Foreign Application Priority Data

| Aug. 24, 2001 | (JP) | 2001-255253 |
| Aug. 24, 2001 | (JP) | 2001-255254 |
| Aug. 24, 2001 | (JP) | 2001-255255 |
| Aug. 24, 2001 | (JP) | 2001-255256 |

(51) Int. Cl.[7] ............................................. F16M 13/00
(52) U.S. Cl. ........................ 248/429; 248/424; 248/430
(58) Field of Search ................... 248/424, 429, 248/430; 297/344.1, 344.11

(56) References Cited

U.S. PATENT DOCUMENTS

| 5,046,697 A | | 9/1991 | Detloff et al. | |
| 5,125,611 A | * | 6/1992 | Cox | 248/429 |
| 5,150,872 A | * | 9/1992 | Isomura | 248/429 |
| 5,292,164 A | * | 3/1994 | Rees | 296/65.15 |
| 5,445,354 A | * | 8/1995 | Gauger et al. | 248/429 |
| 5,487,520 A | * | 1/1996 | Mouri et al. | 248/429 |
| 5,762,309 A | * | 6/1998 | Zhou et al. | 248/429 |
| 5,765,798 A | * | 6/1998 | Isomura | 248/430 |
| 5,810,315 A | | 9/1998 | Dinkel et al. | |
| 5,950,978 A | * | 9/1999 | Eguchi et al. | 248/429 |
| 6,499,712 B1 | * | 12/2002 | Clark et al. | 248/429 |

FOREIGN PATENT DOCUMENTS

| DE | 94 12 155 U1 | 11/1994 |
| DE | 196 17 877 C1 | 6/1997 |
| DE | 196 03 945 C2 | 12/1997 |
| EP | 0 549 082 B1 | 6/1993 |
| GB | 2 309 893 A | 8/1997 |
| JP | 10-968 A | 1/1998 |
| JP | 10-138804 A | 5/1998 |

* cited by examiner

Primary Examiner—Ramon O. Ramirez
Assistant Examiner—Steven Marsh
(74) Attorney, Agent, or Firm—Burns, Doane, Swecker & Mathis, LLP

(57) ABSTRACT

A powered seat sliding apparatus includes a sliding mechanism having a lower rail and an upper rail being movable in a lengthwise direction relative to the lower rail, a feed screw fixedly supported by the upper rail to be rotated around a rotational axis in the lengthwise direction in response to a rotational force of a motor, a slit train provided at both side portions of the lower rail in the lengthwise direction and being engaged with the feed screw, and a feeding mechanism defined between the feed screw and the slit train so as to slidably move the upper rail relative to the lower rail.

35 Claims, 12 Drawing Sheets

POWERED SLIDING APPARATUS FOR A SEAT

CROSS REFERENCE TO RELATED APPLICATIONS

This application is based on and claims priority under 35 U.S.C. § 119 with respect to Japanese Patent Applications 2001-255253, 2001-255254, 2001-255255, and 2001-255256, all filed on Aug. 24 2001, the entire content of which is incorporated herein by reference.

FIELD OF THE INVENTION

This invention generally relates to a powered seat sliding apparatus provided with a pair of parallel sliding mechanisms, each of which includes a lower rail and an upper rail being movable relative to the lower rail in a lengthwise direction thereof. More particularly, this invention pertains to a powered seat sliding apparatus provided with a pair of parallel sliding mechanisms each including a lower rail and an upper rail so that a seat position is hence determined in response to a slidable movement of the upper rail relative to the lower rail by a rotational force of a motor.

BACKGROUND OF THE INVENTION

According to a Japanese Patent Application Laid-open publication H10 (1998)-138804, a powered seat sliding apparatus for a vehicle is exemplified as one of known powered seat sliding apparatus. As illustrated in FIGS. 1 and 2 for the present invention, the powered seat sliding apparatus cited above is provided with a motor equipped at a lower portion of a seat cushion and a pair of sliding mechanisms. Each sliding mechanism is provided as its main elements with a lower rail and an upper rail. The upper rail is movable relative to the lower rail in a lengthwise direction. A rotational speed of the motor is once reduced by a reduction mechanism and then transmitted to the sliding mechanisms. The reduced rotational speed of the motor is further reduced by a gear train, but the speed is increased again immediately in front of each sliding mechanism by the gears. Meantime, a rotational axis direction is switched via the gear train. A worm gear housed in the lower rail and supported by the upper rail of each sliding mechanism is rotated, in response to the transmitted motor rotation, wherein the movement of the upper rail of each sliding mechanism can be performed.

According to the powered seat sliding apparatus with the above-described structure, the worm gear supported by each upper rail is meshed with a slit train defined in a bottom surface of each lower rail (i.e. right and left lower rails). A torsion direction of the worm gear meshed with the slit train of the right lower rail is counter to a torsion direction of the other worm gear meshed with the slit train of the left lower rail, and the worm gears can provide a sliding force with the upper rails relative to the lower rails, when the worm gears apply thrust force by engaging with the slit train of each lower rails. According to the aforementioned structure, an inclined direction of the slit train defined in the bottom surface of the right lower rail is opposite to an inclined direction of the slit train defined in the bottom surface of the left lower rail. Therefore, the right and left lower rails are required to be exclusively applied for the right worm gear and the left worm gear, respectively. In this case, the number of requisite components may be unfavorably increased. Further, the feeding mechanism of the worm gear and the slit train inevitably have slight gaps or resiliency, therefore rattling may be caused with right and left feeding mechanisms.

Further, in the powered seat sliding apparatus with the above-described structure, the rotational force of the motor is transmitted to the gear train equipped to each sliding mechanism via an orthogonal shaft perpendicular to the lengthwise direction of the upper and lower rails. Alternatively, the transmitting of the rotational force can be carried out via a pair of rotary cables (i.e. right and left rotary cables) substituted for the orthogonal shaft. However, as far as a predetermined gear train is requisitely equipped to each sliding mechanism, the total number of components of the powered seat sliding apparatus may be increased so as to result in an increase of the manufacturing cost thereof. Further, unfavorable noise may occur due to the aforementioned structure.

Moreover, the motor, the reduction mechanism directly equipped to the motor, and the orthogonal shaft are all equipped to the seat cushion. In this configuration, the wheel gear displaced to transmit the rotational force from the seat cushion side to the worm gear disposed on the lower rail is large on account of a height of the seat cushion. As a result of it, lower efficiency of the power transmitting may occur through the decrease and increase of the rotational speed. Further, the gear trains equipped immediately in front of the sliding mechanisms may be sized-up so as to eventually result in the size-up of the powered seat sliding apparatus per se. Still further, the power transmitting is performed via the gear trains that have gaps therebetween, and an abrupt seat movement may occur when the seat moving operation is commenced. Even when the pair of rotary cables are substituted for the orthogonal shaft, the above-described drawbacks may still occur as far as the gear trains are equipped immediately in front of the sliding mechanisms.

Further, another powered seat sliding apparatus is disclosed in a Japanese Patent Application Laid-open publication H10 (1998)-968. The powered seat sliding apparatus is provided with a pair of sliding mechanisms. Each sliding mechanism is provided at its main elements with a lower rail and an upper rail. The lower rail is physically held by the upper rail. A lateral width of each sliding mechanism is determined by the width of the upper rail.

A worm gear is disposed in an inner place defined by the upper rail and the lower rail and is supportably hung on a ceiling of the upper rail. More particularly, the worm gear is supported by a housing portion hung from an upper housing portion corresponding to the ceiling of the upper rail. Therefore, a moving force can be transmitted from the worm gear to the upper rail.

According to the sliding apparatus with the above-described structure, the width of the sliding mechanism may be increased. A housing supporting the worm gear is fixed to the upper rail through a ceiling bore of the upper rail. Therefore, when a large load is applied, a twist stress may be applied from the worm gear to a fixed portion with the worm gear. Therefore, the housing is required to have large size for assuring the strength for the stress. Still further, the slit trains formed at tip end portions of the lower rail are processed by cutting because the upper and lower rails are substantially thick and complicated cross-sections which should be formed by light metals extrusion process. Therefore, the manufacturing cost of the lower rail may be raised up.

Accordingly, it is still susceptible of certain improvements with respect to providing an improved powered seat sliding apparatus which can be manufactured with the less number of requisite components at a lower manufacturing cost and can restrain the noise occurrence. Further, the improved powered seat sliding apparatus is required to restrain rattling of both feeding mechanisms and to restrain the abrupt seat movement when the seat moving operation is commenced.

SUMMARY OF THE INVENTION

According to an aspect of the present invention, a powered seat sliding apparatus driven by a motor includes a sliding mechanism having a lower rail and an upper rail being movable in a lengthwise direction relative to the lower rail, a feed screw supported by the upper rail to be rotated around a rotational axis in the lengthwise direction in response to a rotational force of the motor, a slit train provided at both side portions of the lower rail in the lengthwise direction outside an inner side wall of the upper rail and being engaged with the feed screw, and a feeding mechanism defined between the feed screw and the slit train so as to slidably move the upper rail relative to the lower rail. The powered seat sliding apparatus of the present invention is further provided with at least any one of a spring or an opening of each slit as an engagement ensuring means for ensuring an engagement of the silt train with the feed screw of which screw top is gradually reduced toward the top of the feed screw. The slit of the slit train is provided with a pair of edges in the lengthwise direction and a pair of orthogonal edges perpendicular to the pair of edges in the lengthwise direction to define the opening to be a square shape.

According to another aspect of the present invention, the lower rail of the sliding mechanism is provided with an approximately U-shaped lower rail main body and a pair of flanges extending from side portions of the lower rail main body into an inner space of the approximately U-shaped lower rail main body. In this case, the upper rail is disposed between the pair of flanges, the feed screw is supported by the upper rail, and the slit train is provided at the pair of flanges so that the feed screw is engaged with the slit train. The upper rail can be provided with a pair of inner side walls disposed between the pair of flanges and extended in the lengthwise direction, the rotational axis of the feed screw is arranged between the pair of inner side walls, and the pair of inner side walls are partially provided with a notched bore in the lengthwise direction for engaging the feed screw with the slit train, wherein the upper rail is slidably moved relative to the lower rail.

According to further another aspect of the present invention, the pair of flanges can be provided with a pair of inwardly extending flange portions inwardly extending towards the inner space from both ends of the lower rail main body, a pair of downward flange portions downwardly extending from inner edges of the inwardly extending flange portions, and a pair of outwardly extending flange portions outwardly extending from downward edges of the downward flange portions, wherein the slit train is provided from the inwardly extending flange portions to the outwardly extending flange portions via the downward flange portions. The upper rail is provided with a pair of outwardly folded portions of which ends are set in inner spaces defined in the pair of flanges so as to restrain an internal distance between the pair of flanges from being expanded as an expansion restraining means.

According to a still further aspect of the present invention, the powered seat sliding apparatus driven by a motor includes a pair of parallel sliding mechanisms having lower rails and upper rails being movable in a lengthwise direction relative to the corresponding lower rail, respectively, a pair of feed screws disposed between the upper rail and the lower rail to be rotated around a rotational axis in the lengthwise direction in response to a rotational force of the motor, respectively, a pair of feeding mechanisms for slidably moving the upper rail relative to the lower rail in response to a rotation of the feed screw, respectively, a reduction mechanism for reducing the rotational force of the motor, and a rotary cable for,directly transmitting the rotational force reduced by the reduction mechanism to the feed screws. The lower rail is provided with an approximately U-shaped lower rail main body and a flange portion extending from the lower rail main body towards an inner space of the approximately U-shaped lower rail main body, the upper rail is slidably supported in the inner space of the lower rail, the worm gear is supported in the lengthwise direction by the upper rail so as to be rotated, and the slit train is defined at the flange portion, wherein the worm gear is engaged with the slit train. In this case, a rotational direction of one of the pair of feed screws is the same as a rotational direction of the other one of the pair of feed screws.

BRIEF DESCRIPTION OF THE DRAWING FIGURES

The foregoing and additional features and characteristics of the present invention will become more apparent from the following detailed description considered with reference to the accompanying drawing figures wherein.

Figure 14:
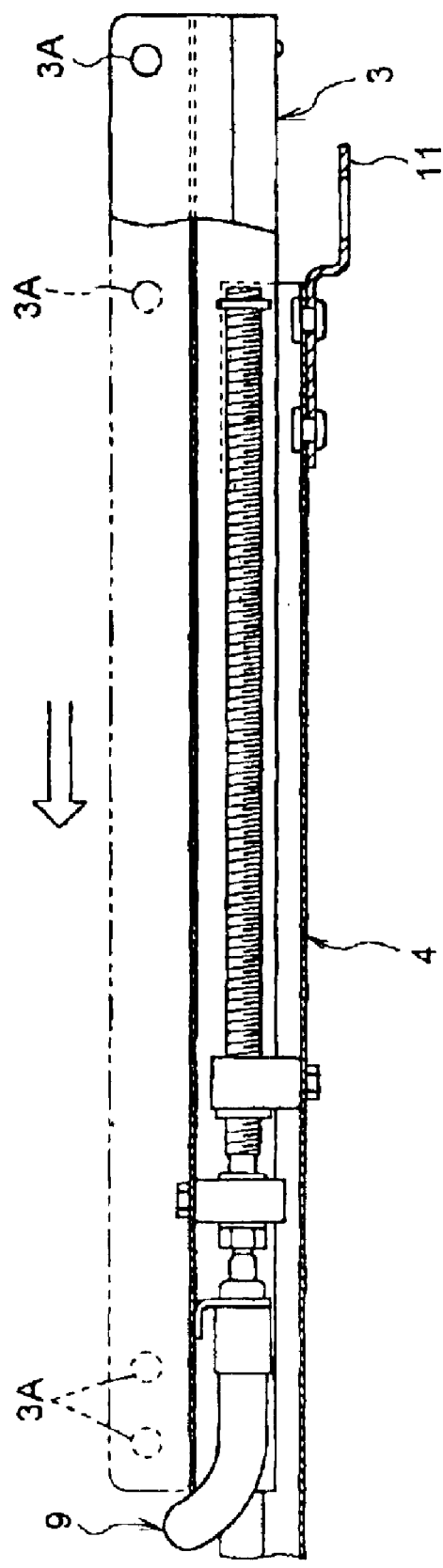

FIGS. 11(*a*) and (*b*) are explanatory views illustrating conditions of a pair of feed screws engaged with a pair of slit trains having square shaped slits, respectively; and FIGS. 12(*a*) and (*b*) are explanatory views illustrating conditions of the pair of feed screws engaged with the pair of slit trains having slits each lateral width of which is narrower than the width of the rest portion thereof, respectively;

FIG. 13 is a plane view illustrating the powered seat sliding apparatus according to another embodiment of the present invention, in which a rotational direction of one of the feed screws is the same as a rotational direction of the other one of the feed screws; and FIG. 14 is an explanatory view illustrating a feeding mechanism formed of a screw shaft and a nut according to another embodiment of the present invention.

DETAILED DESCRIPTION OF THE INVENTION

Figure 1:
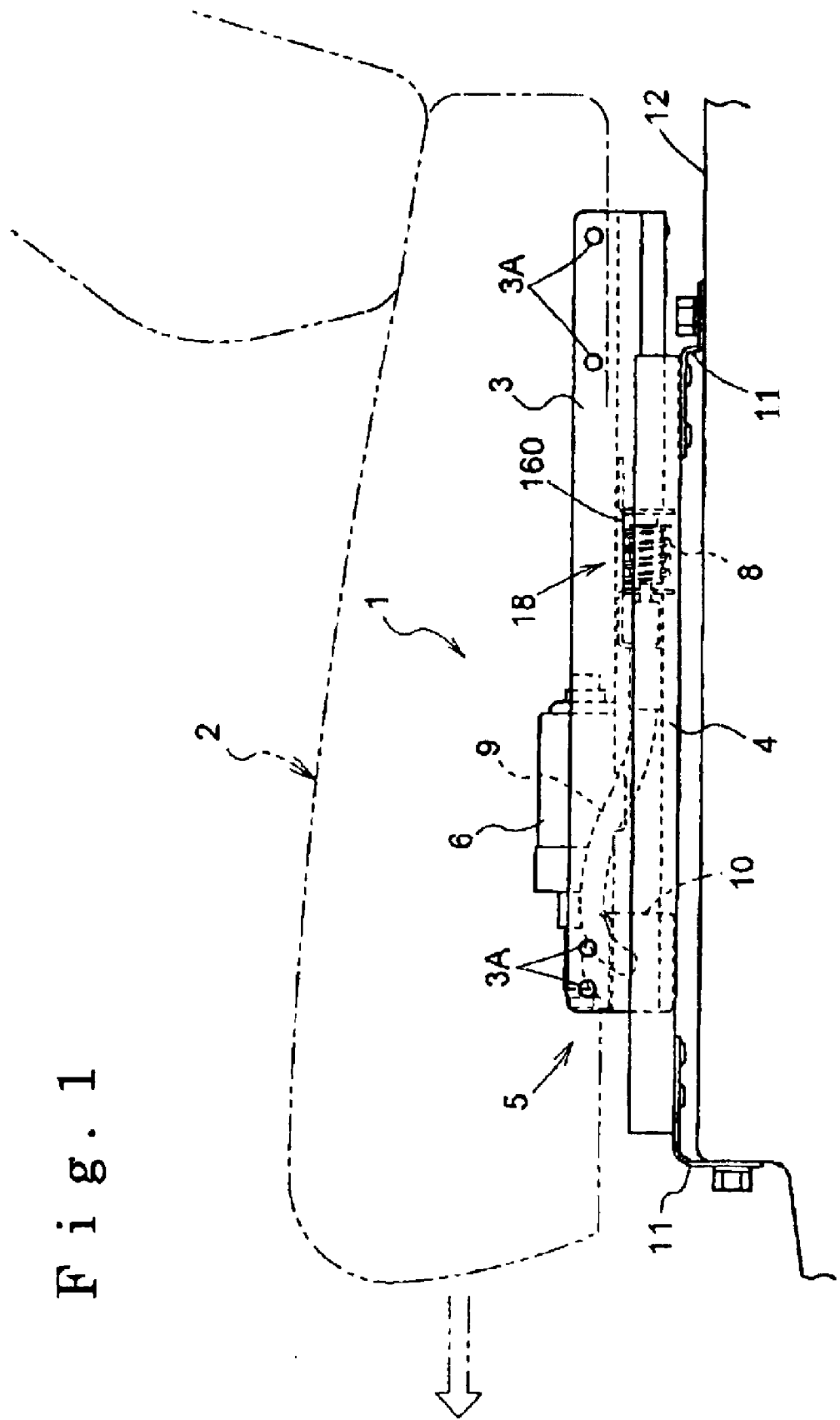
FIG. 1 is a side view illustrating a powered sliding apparatus assembled for a seat according to an embodiment of the present invention.

Referring to FIG. 1, a powered seat sliding apparatus 1 according to an embodiment of the present invention is provided as its major element with a pair of sliding mechanisms 5 (i.e., a right sliding mechanism and a left sliding mechanism) elongated in a direction perpendicular to a width direction of a seat 2. The sliding mechanisms 5 are provided with a pair of upper rails 3 (i.e., a right upper rail and a left upper rail) and a pair of lower rails 4 (i.e., a right lower rail and a left lower rail), respectively. It is to be understood that both upper rails 3 possess the same general configuration so that the description below applies to both upper rails. It is also to be understood that both lower rails 4 possess the same general configuration so that the description below applies to both lower rails.

Figure 2:
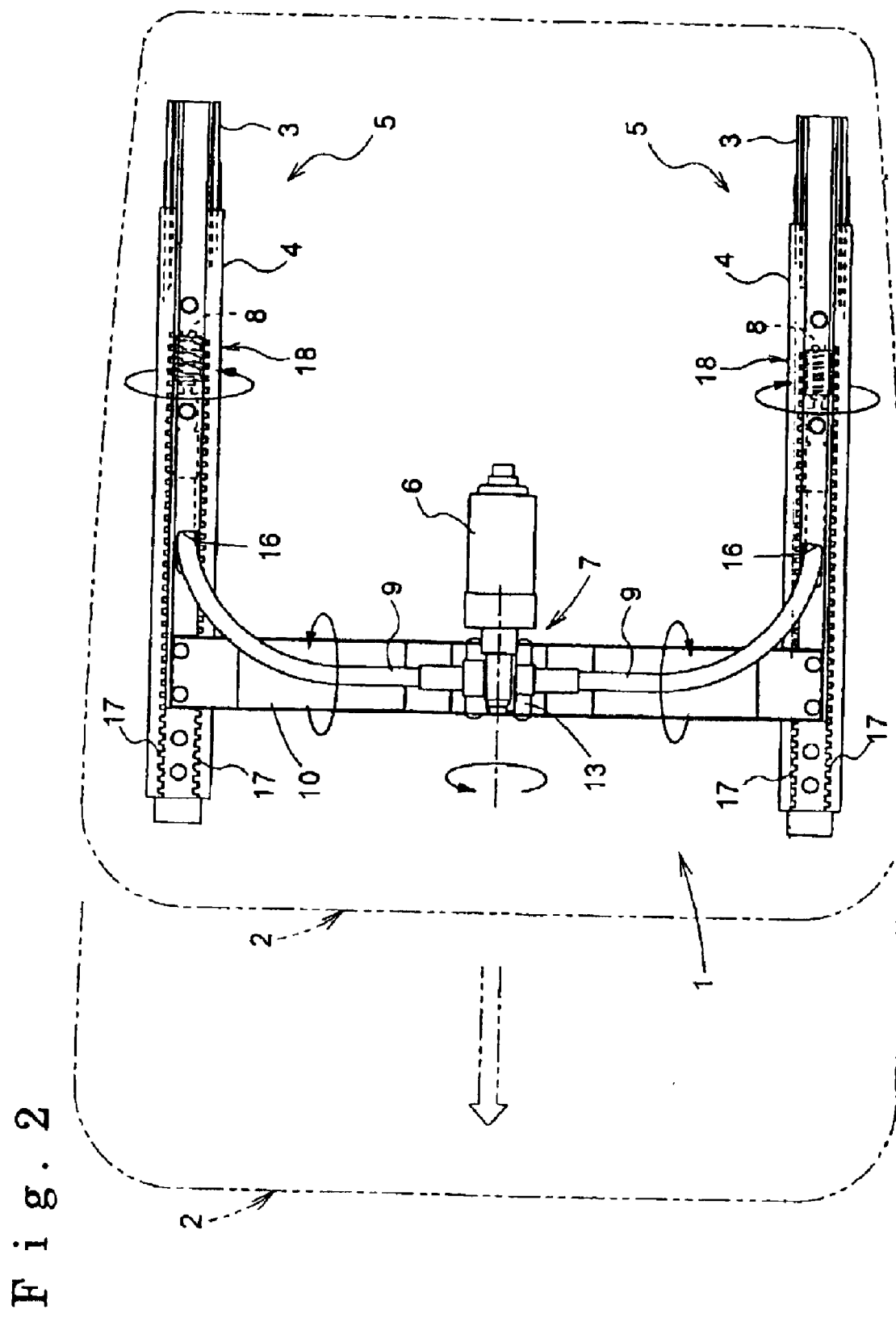
FIG. 2 is a plan view illustrating the powered seat sliding apparatus according to the embodiment of the present invention.
Figure 6:
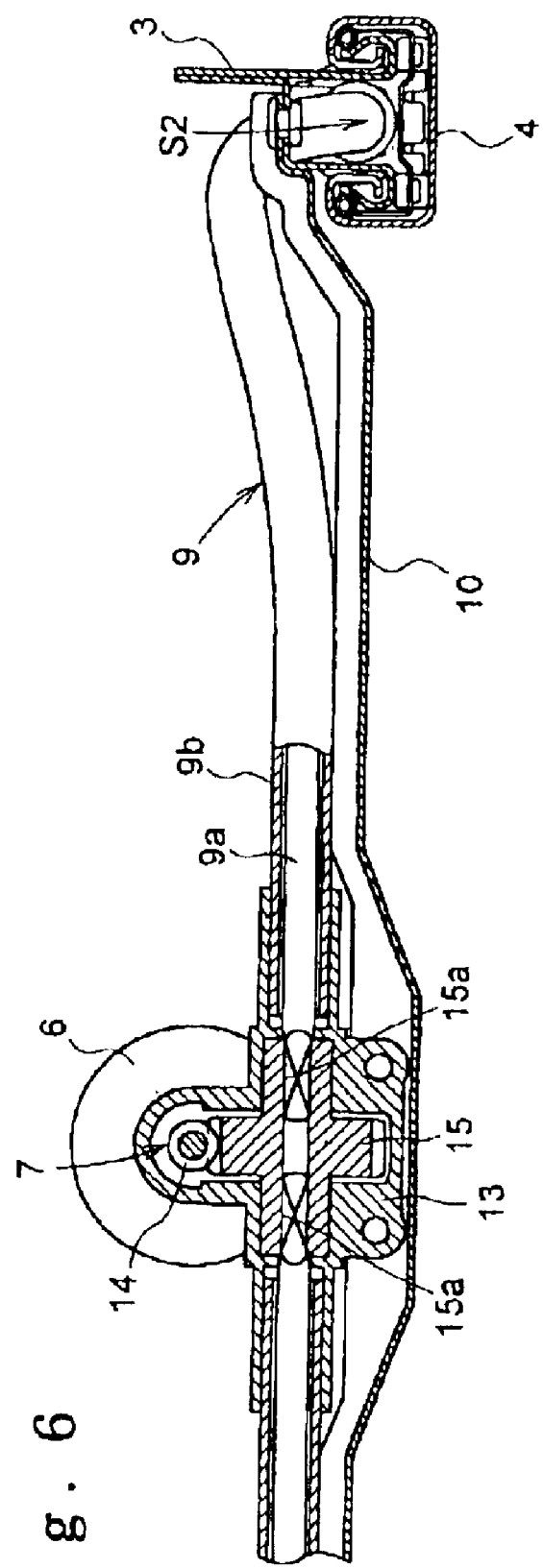
FIG. 6 is a front cross-sectional view illustrating a transmitting mechanism at the vicinity of a motor according to the embodiment of the present invention.

Next, a force transmitting mechanism of the powered sliding apparatus 1 is described below with reference to FIG. 1, FIG. 2 and FIG. 6.

A motor 6, i.e. a power source of the powered sliding apparatus 1, is directly connected to a reduction mechanism 7 which reduces the rotational speed of the motor 6. In this case, a gear train of the known sliding mechanism is not required for the sliding apparatus 1 of the embodiment of the present invention. The rotation of the motor 6 is therefore transmitted to a feed screw 8 equipped to the upper rail 3 via a rotary cable 9. The upper rail 3 can be moved relative to the lower rail 4 in response to a rotation of the feed screw 8 around an axial shaft thereof, whereby a movement of the seat 2 in a vehicle longitudinal direction can be performed. Hereinafter, the feed screw 8 possesses an inclination on a pitch cylinder thereof. The inclination represents an advancing angle designated by a symbol γ in FIG. 11 and FIG. 12.

The upper rail 3 is fixed to the seat 2 via a seat equipping portion 3A. The upper rail 3 is further connected to the seat 2 via a motor supporting bracket 10. The upper rail 3 and the motor supporting bracket 10 can be moved in the vehicle longitudinal direction integrally with the seat 2. The lower rail 4 is fixed to a vehicle floor 12 (a base rack) via a fixing bracket 11.

Figure 3:
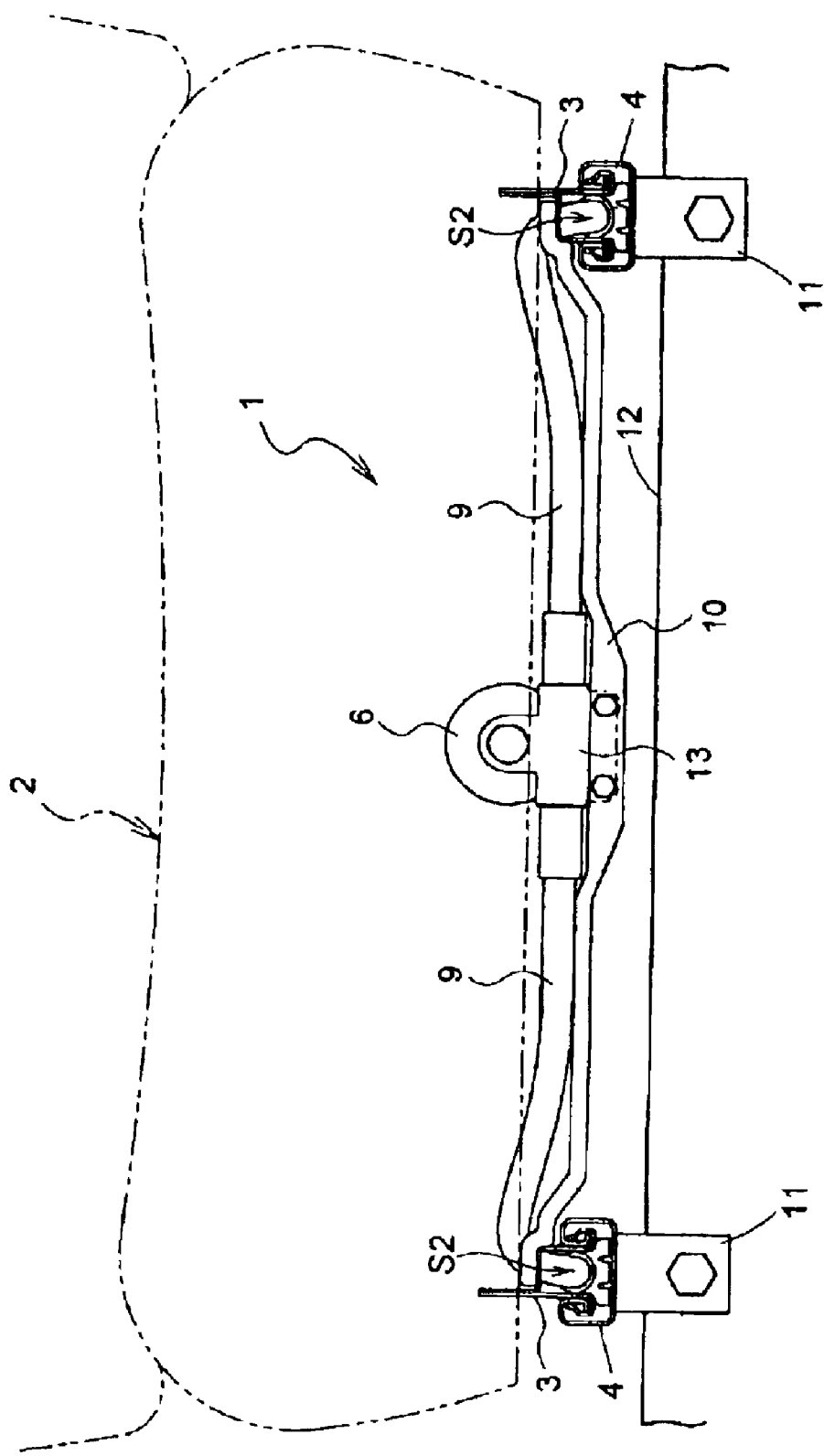
FIG. 3 is a front view illustrating the powered seat sliding apparatus according to the embodiment of the present invention.
Figure 4:
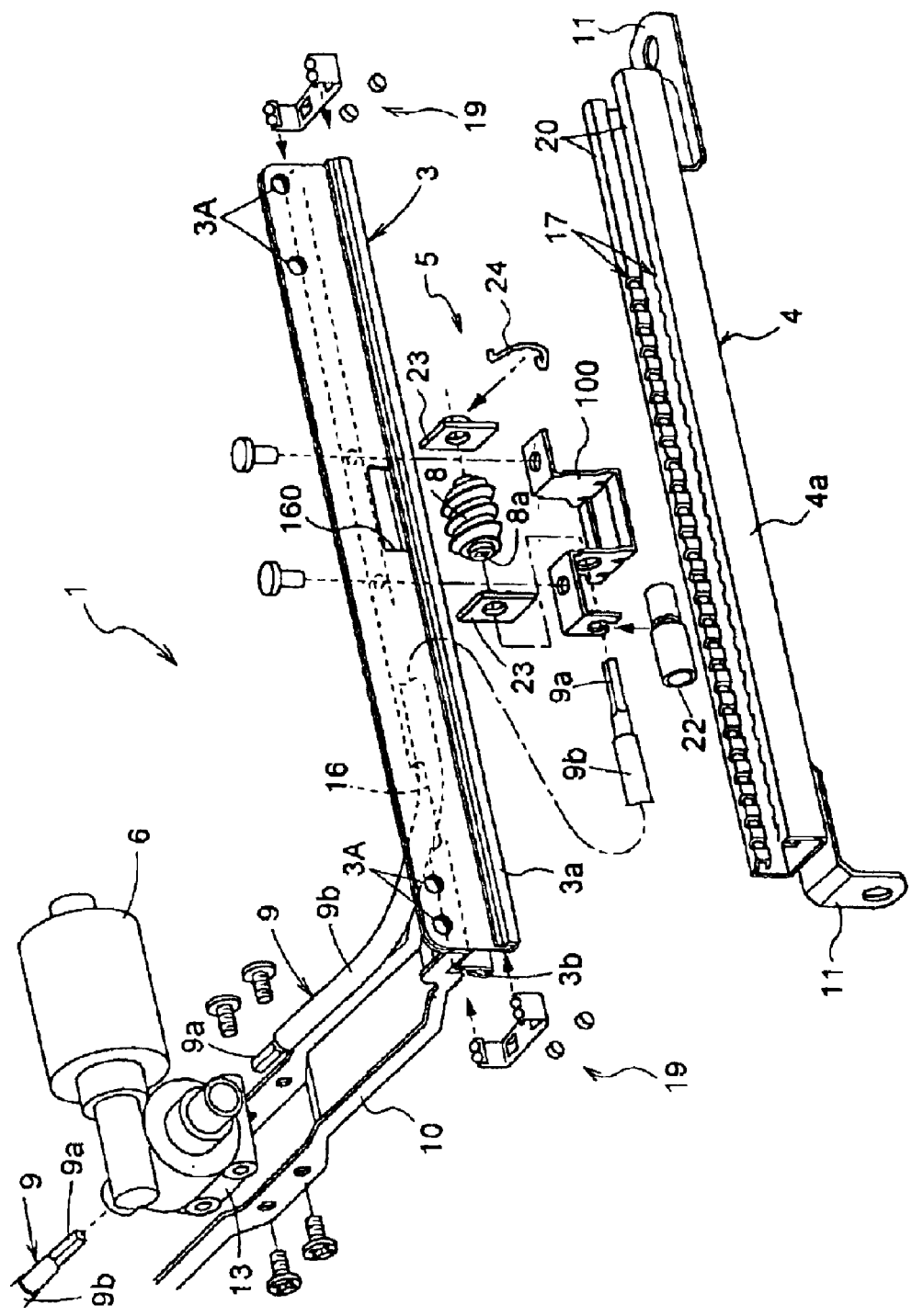
FIG. 4 is a perspective view illustrating an essential portion of the powered seat sliding apparatus according to the embodiment of the present invention.
Figure 5:
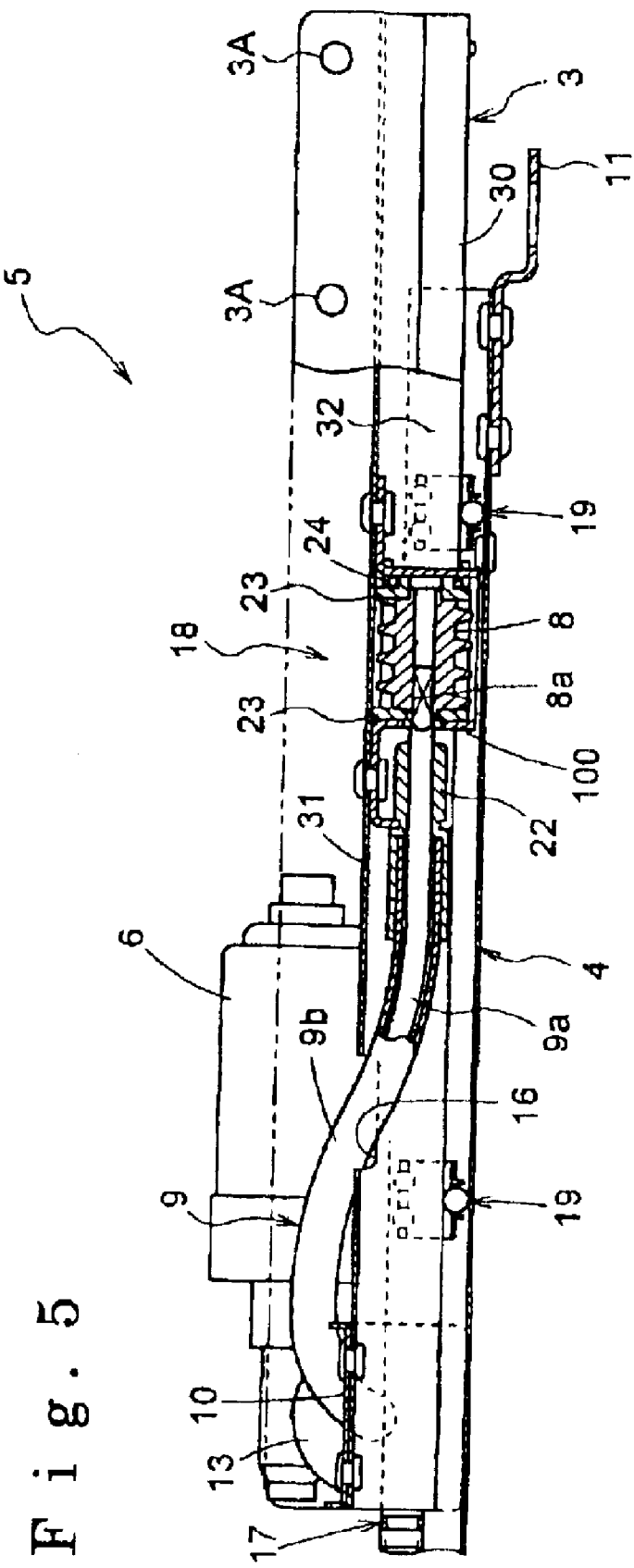
FIG. 5 is a side cross-sectional view illustrating a feeding mechanism of the powered sliding apparatus illustrated in FIG. 1.

As illustrated in FIGS. 2, 3, 4, 6, a driving main body case 13 is disposed at a central portion of the motor supporting bracket 10. The driving main body case 13 houses the motor 6, a worm gear 14 (illustrated in FIG. 6) directly connected to an output shaft of the motor 6 and a wheel gear 15 (illustrated in FIG. 6) engaged with the worm gear 14. Square bores 15a are defined at both shaft ends of the wheel gear 15 so as to extract the rotational force of the motor 6 with the reduced rotational speed by the reduction mechanism 7 therefrom. The reduction mechanism 7 includes the worm gear 14 and the wheel gear 15. Further, as illustrated in FIG. 5, a square bore 8a is defined at an input portion of the feed screw 8 of each sliding mechanism 5 so as to receive the resultant rotational force.

An inner shaft 9a of the rotary cable 9 is disposed between the square bore 15a of the wheel gear 15 and the square bore 8a of the feed screw 8 so as to transmit the rotational force therebetween. The rotary cable 9 is formed of an outer tube 9b (illustrated in FIG. 4) and the inner shaft 9a penetrating through the outer tube 9b. Both the inner shaft 9a and the outer tube 9b are flexible. The rotary cable 9 is introduced into the upper rail 3 through a notched portion 16 defined at the upper rail 3. The notched portion 16 is required to have a sufficient width for guiding the rotary cable 9 in a direction of a rotational axis of the feed screw 8. Further, the width of the notched portion 16 is controlled to be minimized. As a result of this, the sliding mechanism 5 can be compact and light weighted. Therefore, according to the powered seat sliding apparatus 1 of the embodiment of the present invention, the increased rotational force with the rotational speed reduced by the reduction mechanism 7 is directly transmitted to the feed screw 8 of each sliding mechanism 5 via the rotary cable 9 so as to move each upper rail 3. The rotary cable 9 serves for transmitting the rotational force at a constant speed to each feed screw 8 without performing the change of the rotational speed. Further, the rotary cable 9 can switch a rotational force transmitting direction thereof if necessary, according to the embodiment of the present invention. In this case, the rotational direction of the feed screw 8 of the right sliding mechanism 5 counters to the rotational direction of the feed screw 8 of the left sliding mechanism 5 as illustrated in FIG. 2. Further, because the sliding apparatus 1 employs the rotary cable 9, a space required for disposing the rotary cable 9 is enough as provided between the seat cushion and the vehicle floor. Still further, a torsion amount of the rotary cable 9 can absorb an abrupt initiation of the moving operation of the seat per se in the vehicle longitudinal direction. Therefore, the sliding apparatus 1 according to the embodiment of the present invention can restrain the abrupt seat movement.

Next, a moving mechanism between the upper rail 3 and the lower rail 4 is described below.

Figure 7:
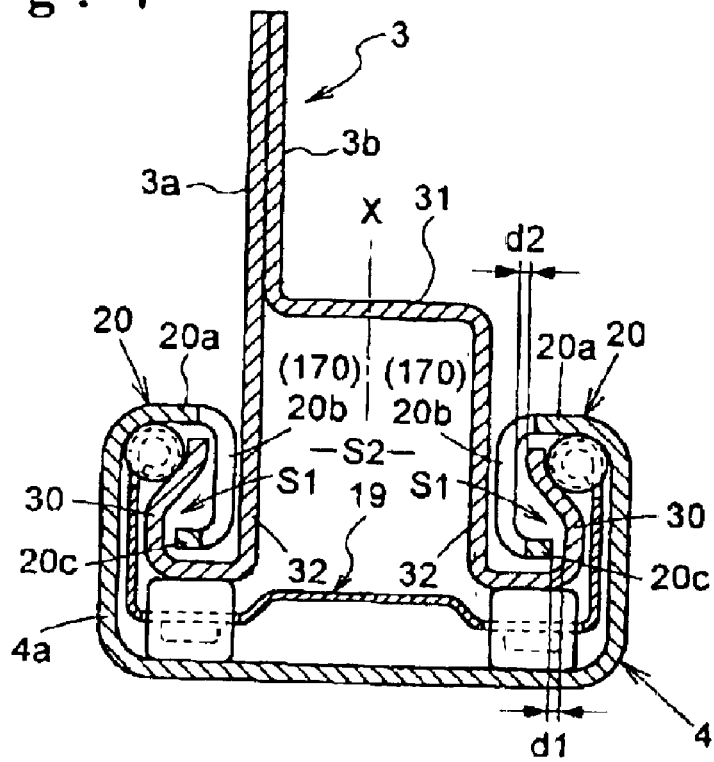
FIG. 7 is a cross-sectional view illustrating a sliding mechanism including an upper rail and a lower rail according to the embodiment of the present invention.

A feeding mechanism 18 according to the embodiment of the present invention is defined between the feed screw (a substantially short worm) 8 and a pair of slit trains 17 integrally provided for the lower rail 4. The feed screw 8 is supported by the upper rail 3 in the lengthwise direction thereof so as to be freely rotated. The upper rail 3 can hence be slidably moved in the lengthwise direction thereof. As illustrated in FIG. 4, a pair of sliding members 19 are disposed between the upper rail 3 and the lower rail 4 of the sliding mechanism 5. The upper rail 3 can hence be slidably and freely moved relative to the lower rail 4. Further, as illustrated in FIGS. 3 and 7, the upper rail 3 is supported by an inner space of the lower rail 4. Therefore, the sliding apparatus 1 can be compact.

As illustrated in FIG. 7, the lower rail 4 is integrally provided with an approximately U-shaped lower rail main body 4a and a pair of flanges (both side portions) 20 integrally extending at the vicinity of upper ends of the lower rail main body 4a towards an inner space of the lower rail main body 4a. The pair of flanges 20 is integrally provided with inwardly extending flange portions 20a, which extend from the upper ends of the lower rail main body 4a towards the inner space thereof, downward flange portions 20b, which downwardly extends from inner edges of the inwardly extending flange portions 20a, and outwardly extending flange portions 20c, which outwardly extend from downward edges of the downward flange portions 20b. Hereinafter, the inner side is defined to be in a direction near to a central axis X relative to a width direction of the lower rail 4 and the outer side is defined to be in a direction to be away from the central axis X. The pair of flanges 20 is provided with the slit trains 17. The shape of each slit 170 of the slit trains 17 is described later. The lower rail 4 can be processed, for example, from a predetermined shaped sheet metal. The sheet metal formed with predetermined shaped slit train 17 can be integrally bent at a predetermined position in the lengthwise direction. The pair of flange portions 20 can be formed simply by bending a thin and approximately U-shaped plate member rotated in a counterclockwise direction at 900. The upper rail 3 can be manufactured in the same process.

As illustrated in FIG. 7, the upper rail 3 is formed by integrating a first upper rail member 3a, which is a flat plate integrally provided with predetermined folded portions 30 (a pair of outwardly folded portions) at edge portions thereof, and a second upper rail member 3b, which is a flat plate integrally provided with the predetermined folded portions 30 at edge portions thereof and with a stepped portion 31 at a predetermined position thereof. A portion of the upper rail 3 under the stepped potion 31 can be inserted into a space between the pair of flanges 20 of the lower rail 4. Portions of the upper rail 3 positioned between the downward flange portions 20b of the lower rail 4 are designated as inner side walls 32. When the sliding apparatus 1 is applied to the vehicle, the lower rail 4 is equipped to a vehicle floor and the upper rail 3 is equipped to the vehicle seat. Because the upper rail 3 is slidably movable in the inner space of the lower rail 4, the space for disposing the upper rail 3 between the vehicle seat and the vehicle floor can be effectively decreased. Further, an entire size of the sliding apparatus 1 can be substantially economic of space.

When the upper rail 3 is completely assembled to the lower rail 4, the folded portions 30 of the upper rail 3 are set in flange inner spaces S1 defined in the flanges 20 of the lower rail 4. In this case, a first space d1 and a second space d2 of each flange 20 are defined to be relatively small as illustrated in FIG. 7. Therefore, even when an interval between the pair of flanges 20 is expanded by an excessive load, the upper rail 3 comes in contact with a predetermined position of the lower rail 4. Therefore, the lower rail 4 can be prevented from being expanded. The aforementioned structure represents an expansion restraining means according to the embodiment of the present invention. An actual opening width of each space d1 and d2 is preset to be substantially 1 mm. Hereinafter, an entire width of the lower rail 4 is preset to be substantially 40 mm and an interval between the downward flange portions 20b is preset to be substantially 20 mm. Therefore, the interval between the flange portions 20b can be restrained from being expanded to be greater than the constant width 20 mm. In this case, as described below, the engaging depth of the feed screw 8 and the slit 170 can always be ensured.

Next, an assembling structure of the feed screw 8 to the upper rail 3 and a position of the feed screw 8 in the sliding mechanism 5 are described below.

Figure 8:
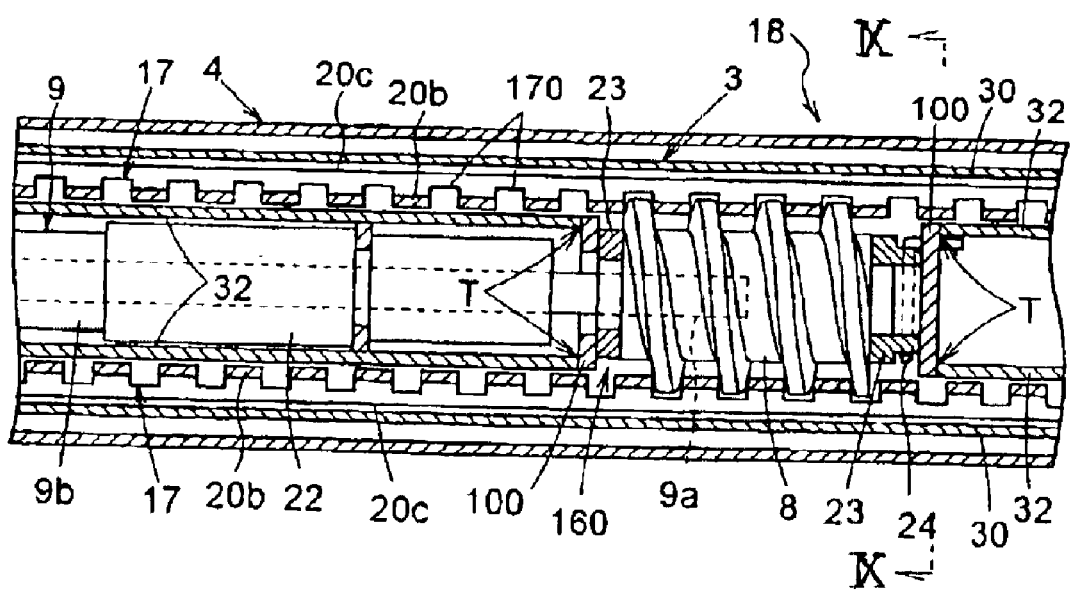
FIG. 8 is a cross-sectional view more minutely illustrating the feeding mechanism illustrated in FIG. 5.
Figure 10:
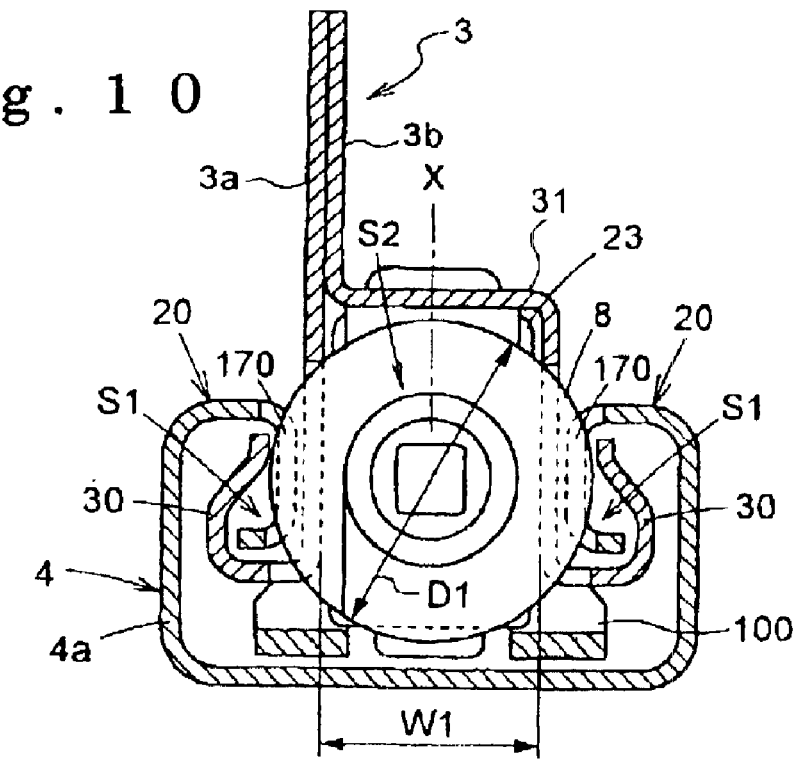
FIG. 10 is a cross-sectional view taken along a section line Z—Z in FIG. 8 and illustrates an engaged condition of a feed screw with a slit train.

Referring to FIG. 4, the feed screw 8 is supported between the inner side walls 32 of the upper rail 3 via a screw supporting bracket 100. The majority of the feed screw 8 is housed in an inner space S2 (illustrated in FIG. 7) of the lower rail 4 when the upper rail 3 has been completely assembled to the lower rail 4. The screw supporting bracket 100 serves for supporting a casing 22 for guiding the rotary cable 9. The screw supporting bracket 100 can be assembled to the stepped portion 31 of the upper rail 3 from the bottom side thereof. Edge portions T (illustrated in FIG. 8) in a lengthwise direction of the screw supporting bracket 100 become in contact with edge surfaces of the inner side walls 32 at notched bores 160 defined in a lengthwise direction of the inner side walls 32. Therefore, the moving force in the lengthwise direction is transmitted from the feed screw 8 to the upper rail 3 via the edge portions T and the notched bores 160. Right and left side portions of the feed screw 8 are outwardly exposed through the screw supporting bracket 100. Further, a bottom surface of the screw supporting bracket 100 corresponding to the feed screw 8 is partially notched. The feed screw 8 can be hence preferably engaged with the slit trains 17 of the flanges 20. Therefore, the feed screw 8 engages with the both sides of the slit trains 17 by one pitch, wherein the feeding operation can be stabilized. As illustrated in FIG. 10, a diameter D1 of the feed screw 8 is greater than a width W1 of the upper rail 3, i.e. a width W1 between the inner side walls 32. To achieve the aforementioned structure, the width of the screw-supporting bracket 100 is gradually increased as it downwardly goes to the side portions thereof.

Figure 9:
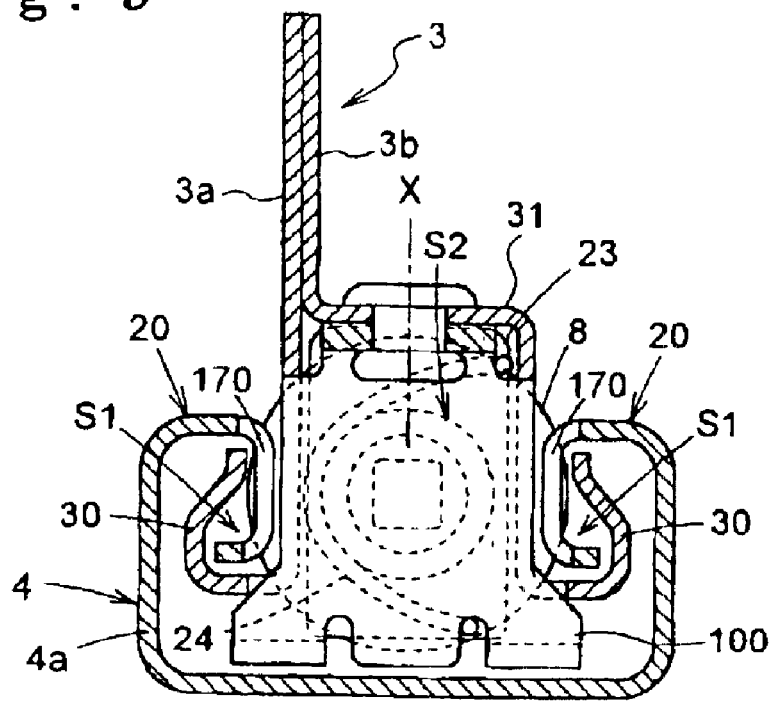
FIG. 9 is a cross-sectional view taken along a section line Y—Y in FIG. 8.

The feed screw 8 is disposed at a predetermined position of the screw support bracket 100 via a pair of bushes 23. As illustrated in FIGS. 4 and 9, a spring 24 is disposed at a predetermined position between the feed screw 8 and the screw supporting bracket 100 so as to bias the feed screw 8 in a direction of the slit train 17 provided for one of the flanges 20 (i.e., the flange 20 located at a right side in FIG. 9). The spring 24 is in a bow-shaped structure with hooks at both ends thereof. The biasing force of the spring 24 can be executed by bringing a central portion of the spring 24 in contact with the bush 23 and by hooking both ends thereof at the screw supporting bracket 100. Therefore, the feed screw 8 can be firmly engaged with the slit train 17, wherein an occurrence of rattling may be decreased. Therefore, the lateral width of the bush 23 is set to be smaller than the width W1 between the inner side walls 32 and can be flexibly displaced in the width direction in response to the biasing force of the spring 24.

As described above, the feed screw 8 having a substantially larger diameter is supported to be slidably movable relative to the upper rail 3 and penetrates through the notched bores 160 of the inner side walls 32. The feed screw 8 can be hence engaged with the slit trains 17 of the flanges 20. Further, the feed screw 8 can be engaged with one of the slit trains 17 with a larger engaging amount than with the other. As aforementioned, the rotational force of the feed screw 8 can be transmitted to the upper rail 3 via the pair of inner side walls 32, wherein the rotational force can be transmitted to the upper rail 3 supported at both sides thereof. In this case, the sliding mechanism 5 can be rigid. Therefore, the amount of the sliding mechanism 5 can be light weighted by being formed with a molded sheet metal.

Figure 11A:
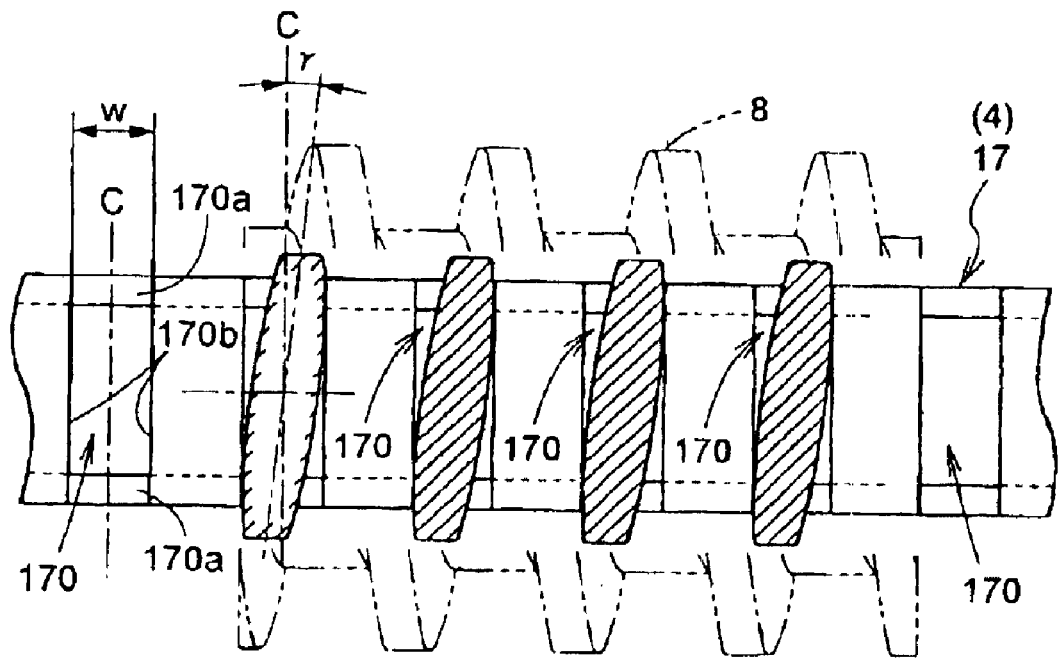
Figure 11B:
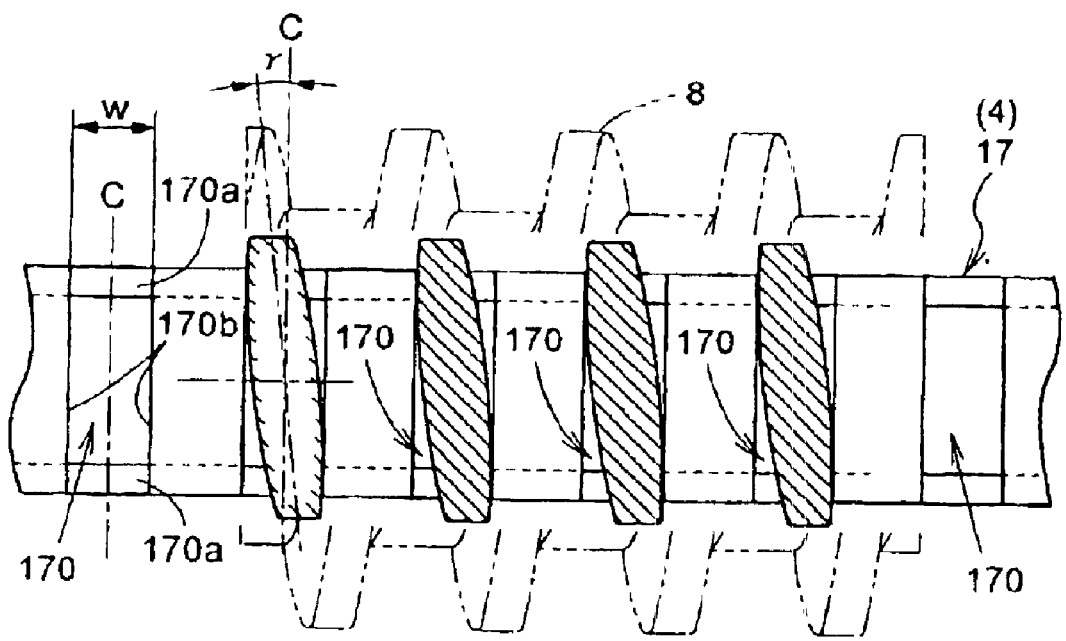

As illustrated in FIG. 11, the screw top of the feed screw 8 is in a trapezoid shaped structure. Each slit 170 of the slit train 17 is a slit with a square shaped opening (an engagement ensuring means) and is provided with a pair of lengthwise direction edges 170a and a pair of orthogonal edges 170b perpendicular to the lengthwise direction. An opening width W in the lengthwise direction is defined for engaging either one of the feed screws 8 having the counter torsion directions with the slit 170 changing postures of the feed screws 8. An angle of the torsion direction of the feed screw 8 of the right sliding mechanism 5 is the same as an angle of the torsion direction of the feed screw 8 of the left sliding mechanism 5 and is designated as an absolute value γ. FIGS. 11(a) and 11(b) show the engaged conditions of the feed screws 8 with the same slit 170, respectively.

Further, as illustrated in FIGS. 11(a) and 11(b), the tooth width of a screw top of the feed screw 8 is gradually reduced toward the top of the feed screw 8. As described above, the sliding mechanism 5 is provided with the spring 24 for biasing the feed screw 8 toward the slit 170. Therefore, a gap between the slit 170 and the screw top of the feed screw 8 can be decreased so as to restrain the rattling. Therefore, the upper rail 3 can be smoothly moved relative to the lower rail 4.

Further, a cross-section of a portion of the feed screw 8 inserted into the slit 170 is expanded around a portion at the vicinity of the central axis of the feed screw 8. A torsion direction axis of the feed screw 8 is inclined to a line perpendicular to the lengthwise direction. As illustrated in FIG. 11(a), the torsion direction axis of the feed screw 8 of one of the sliding mechanisms 5 is inclined relative to the cross-section illustrated by a diagonal line with the angle γ. As illustrated in FIG. 11(b), the torsion direction axis of the feed screw 8 of the other one of the sliding mechanisms 5 is inclined relative to the cross-section illustrated by a diagonal line with the angle γ. Therefore, a cross-sectional surface of the feed screw 8 has a contact point with the pair of orthogonal edges 170b perpendicular to the lengthwise direction, wherein the feed screw is engaged with the slit 170. Accordingly, the right lower rail 4 can be the same as the left lower rail 4 according to the embodiment of the present invention.

Although the powered seat sliding apparatus 1 described above is mounted on the vehicle, the powered seat sliding apparatus 1 is not limited only to be applied to the vehicle and also can be applied to an optional object in which the seat movement is performed in a seat longitudinal direction and the seat position is determined. According to the embodiment of the present invention, the side to which the lower rail 4 is equipped is designated as a base rack.

According to the embodiment of the present invention, the screw top of the feed screw 8 is in the trapezoid shaped structure. However, the screw top of the feed screw 8 can be in a triangle shaped structure.

Figure 12A:
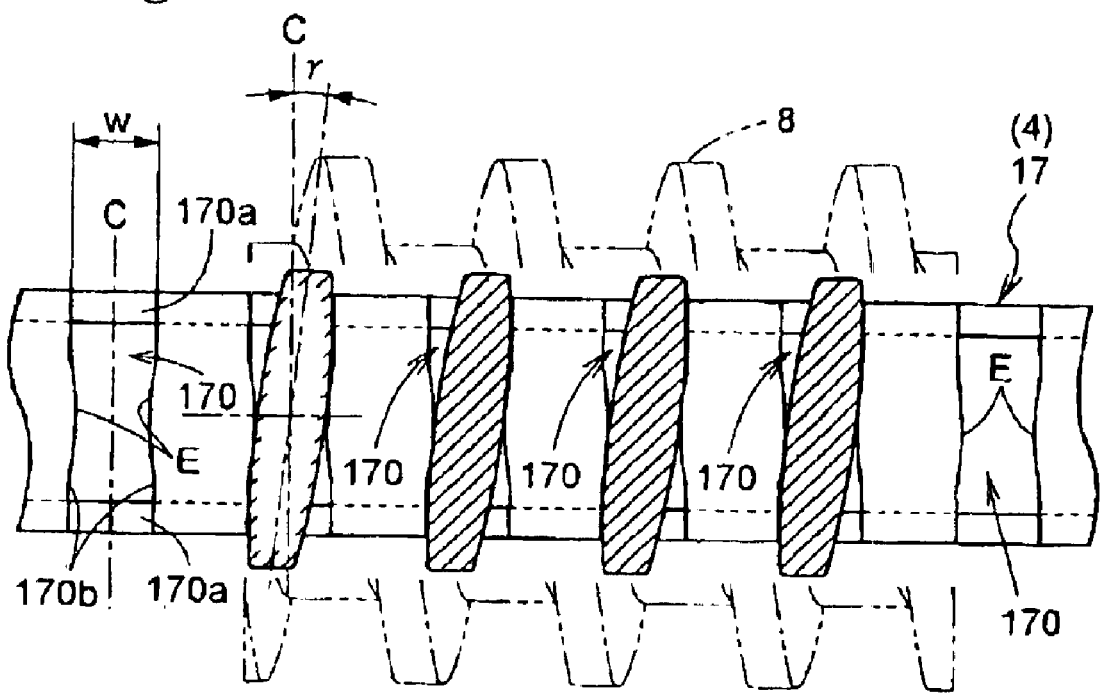
Figure 12B:
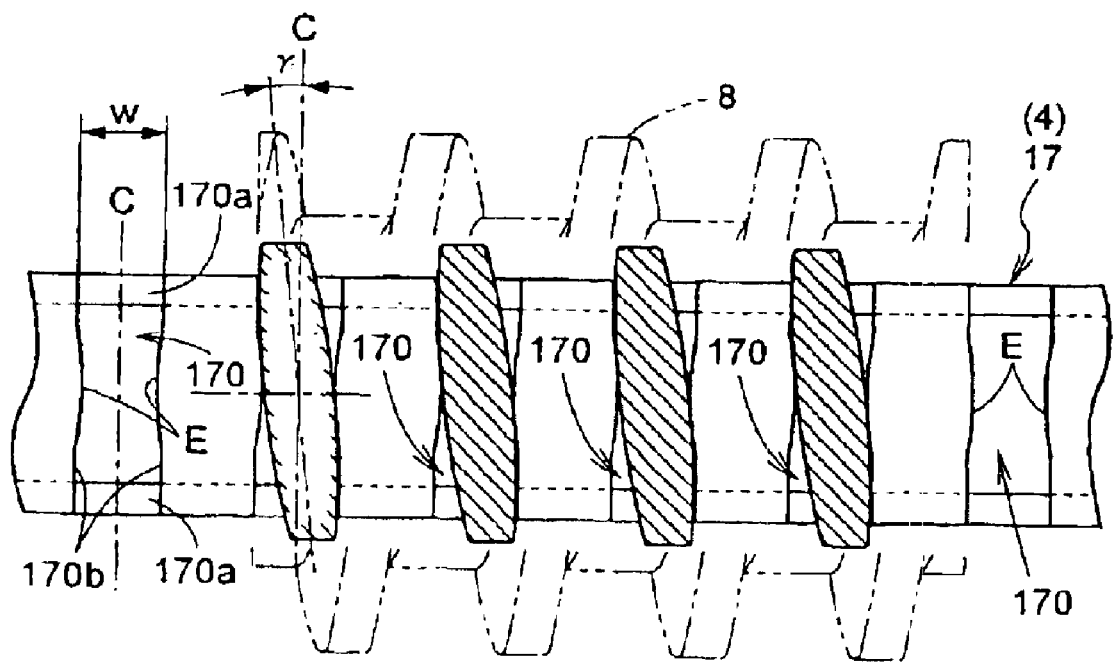
Figure 1:
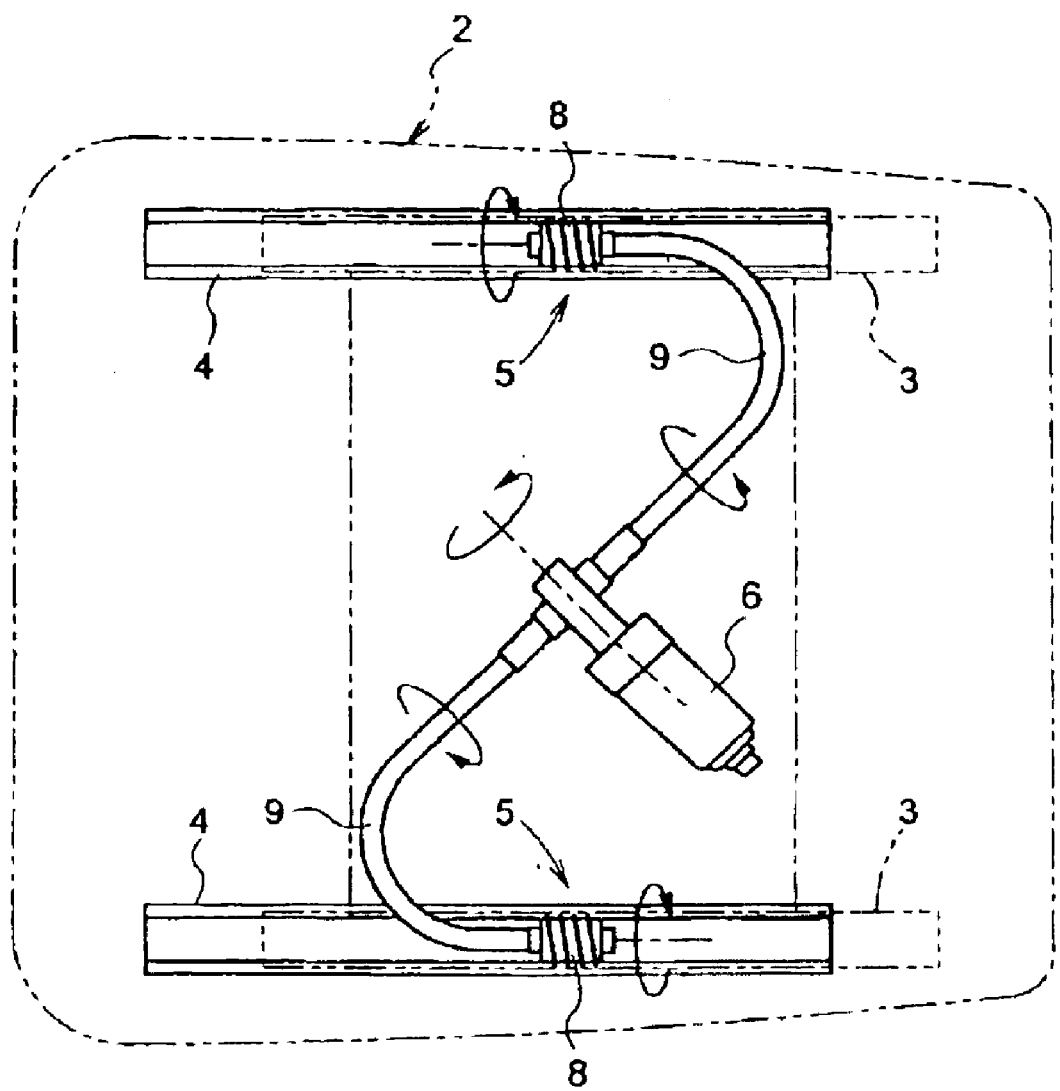

According to the embodiment of the present invention, the slit is in the square shaped structure. However, the slit 170 can be a narrower width at a central side portion around the rotational axis of the feed screw 8 than the width of the rest portion thereof. As illustrated in FIGS. 12(a) and 12(b), when the slit 170 for the feed screws 8 having the different torsion directions is smoothly projected at the central side portion, the projected central side portion of the slit 170 can be engaged with a portion at the vicinity of the rotational axis of the feed screw 8, i.e. can be engaged with a deep portion of a screw top of the feed screw 8. Therefore, the projected central side portion of the slit 170 can become in contact with a portion near to the tooth bottom of the feed screw 8, wherein an engaged condition can be stably and smoothly performed. A smooth sliding movement of the upper rail 3 relative to the lower rail 4 can be hence performed. In this case, the pair of lower rails can be in the same structure. In this case, the feed screw 8 with the screw top in the square shaped structure can be applicable relative to the slit 170 with the aforementioned structure.

As described above, each sliding mechanism 5 is provided with the feed screw 8 having a screw top being in the triangle shaped structure or the trapezoid shaped structure. Further, each sliding mechanism 5 is further provided with the slit 170 forming the slit train 17. The slit 170 has a slit central axis C perpendicular to the advancing direction of the feed screw 8, i.e. a slit central axis C perpendicular to the lengthwise direction of the upper rail 3 and the lower rail 4. The slit 170 is provided with both edges defining the symmetric opening (the engagement ensuring means), which is symmetrically distributed in the lengthwise direction of the slit 170 relative to the slit central axis C.

According to the embodiment of the present invention, the rotational force of the motor 6 is once extracted in a direction perpendicular to the lengthwise direction of the upper and lower rails and is further extracted in the same direction as the lengthwise direction thereof. In this case, as illustrated in FIG. 2, the rotational direction of the feed screw 8 of the right sliding mechanism 5 is opposite to the rotational direction of the feed screw 8 of the left sliding mechanism 5. On the other hand, if the rotational force of the motor 6 is extracted as illustrated in FIG. 13, the rotational direction of the feed screw 8 of the right sliding mechanism 5 is the same as the rotational direction of the left sliding mechanism 5. In this case, the feed screw 8 of the right sliding mechanism 5 can be identical to the feed screw 8 of the left sliding mechanism 5.

According to the embodiment of the present invention, the feeding mechanism 18 is structured by combining the feed screw 8 (the substantially short worm) and the slit train 17 engaged with the feed screw 8. However, as illustrated in FIG. 14, the feeding mechanism 18 can be structured by combining a screw shaft equipped to the upper rail 3 and a nut provided at the lower rail 4. In this case, the upper rail 3 can be stably and smoothly moved in the lengthwise direction owing to this aforementioned structure.

A biasing means (the engagement ensuring means) according to the embodiment of the present invention is established by the spring 24 equipped to the bush 23 located at one side of the feed screw 8 in the axial direction thereof. However, the biasing means can be established by respectively equipping springs to the bushes located at both sides of the feed screw 8.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A powered seat sliding apparatus driven by a motor, comprising:

a sliding mechanism having a lower rail and an upper rail movable in a lengthwise direction relative to the lower rail;

a feed screw rotatable supported by the upper rail to be rotated around a rotational axis in the lengthwise direction in response to a rotational force of the motor;

a slit train provided at both side portions of the lower rail in the lengthwise direction outside of an inner side wall of the upper rail and engaged with the feed screw;

a rotary cable operatively connected to the feed screw to transmit the rotational force of the motor to the feed screw to rotate the feed screw;

the rotary cable having an end Portion arranged in the lower rail;

wherein a tooth width of a screw top of the feed screw is gradually reduced toward the top of the feed screw; and an engagement ensuring means for ensuring an engagement of the screw top with the slit train;

wherein the engagement ensuring means includes a biasing means for biasing the screw top in a direction of the slit train.

2. A powered seat sliding apparatus, according to claim 1, wherein the screw top of the feed screw includes either a triangle shape or a trapezoid shape.

3. A powered seat sliding apparatus, according to claim 1, wherein the engagement ensuring means includes a symmetric opening relative to a slit central axis of a slit of each slit train, and the slit central axis is perpendicular to the lengthwise direction.

4. A powered seat sliding apparatus, according to claim 1, wherein the biasing means is a spring for biasing a bush supporting the feed screw to be rotated and supported by the upper rail in the direction of the slit train.

5. A powered seat sliding apparatus, according to claim 3, wherein the slit is provided with a pair of edges in the lengthwise direction and a pair of orthogonal edges perpendicular to the pair of edges in the lengthwise direction to define the opening to be a square shape.

6. A powered seat sliding apparatus, according to claim 3, wherein the slit is provided with a central side portion around the rotational axis of the feed screw, an opening width of the slit at the central side portion is smaller than a width of a rest portion thereof, wherein the central portion with the smaller opening width is engaged with the feed screw.

7. A powered seat sliding apparatus, according to claim 6, wherein the screw top of the feed screw includes either a triangle shape, a trapezoid shape, or a square shape.

8. A powered seat sliding apparatus driven by a motor, comprising:
a sliding mechanism having a lower rail and an upper rail movable in a lengthwise direction relative to the lower rail;
a feed screw fixedly supported by the upper rail to be rotated around a rotational axis in the lengthwise direction in response to a rotational force of the motor;
a slit train provided at both side portions of the lower rail in the lengthwise direction and engaged with the feed screw;
the lower rail including;
an approximately U-shaped lower rail main body; and
a pair of flanges extending from side portions of the lower rail main body into an inner space of the approximately U-shaped lower rail main body, wherein the upper rail is disposed between the pair of flanges, the feed screw is supported by the upper rail, and the slit train is provided at each of the pair flanges so that the feed screw is engaged with the slit train.

9. A powered seat sliding apparatus, according to claim 8, wherein the tooth width of a screw top of the feed screw is gradually reduced toward the top of the feed screw, further comprising:
an engagement ensuring means for ensuring an engagement of the screw top with the slit train.

10. A powered seat sliding apparatus, according to claim 9, wherein the screw top of the feed screw includes either a triangle shape or a trapezoid shape.

11. A powered seat sliding apparatus, according to claim 9, wherein the engagement ensuring means includes a symmetric opening relative to a slit central axis of a slit of each slit train, and the slit central axis is perpendicular to the lengthwise direction.

12. A powered seat sliding apparatus, according to claim 9, wherein the engagement ensuring means includes a biasing means for biasing the screw top in a direction of the slit train.

13. A powered seat sliding apparatus, according to claim 12, wherein the biasing means is a spring for biasing a bush supporting the feed screw to be rotated and supported by the upper rail in the direction of the slit train.

14. A powered seat sliding apparatus, according to claim 11, wherein the slit is provided with a pair of edges in the lengthwise direction and a pair of orthogonal edges perpendicular to the pair of edges in the lengthwise direction to define the opening to be a square shape.

15. A powered seat sliding apparatus, according to claim 11, wherein the slit is provided with a central side portion around the rotational axis of the feed screw, an opening width of the slit at the central side portion is smaller than a width of a rest portion thereof, wherein the central portion with the smaller opening width is engaged with the feed screw.

16. A powered seat sliding apparatus, according to claim 15, wherein the screw top of the feed screw includes either a triangle shape, a trapezoid shape, or a square shape.

17. A powered seat sliding apparatus, according to claim 8, wherein the upper rail is provided with a pair of inner side walls disposed between the pair of flanges and extended in the lengthwise direction, the rotational axis of the feed screw is arranged between the pair of inner side walls, and the pair of inner side walls are partially provided with a notched bore in the lengthwise direction for engaging the feed screw with the slit train, wherein the upper rail is slidably moved relative to the lower rail.

18. A powered seat sliding apparatus, according to claim 16, wherein a moving force in the lengthwise direction is transmitted from the feed screw to the upper rail via the pair of inner side walls.

19. A powered seat sliding apparatus, according to claim 8, further comprising:
a sliding member disposed in the lower rail for slidably supporting a part of the upper rail in the inner space of the lower rail main body, wherein the part of the upper rail is slidably moved relative to the lower rail.

20. A powered seat sliding apparatus, according to claim 8, wherein the pair of flanges is provided with a pair of inwardly extending flange portions inwardly extending towards the inner space from both ends of the lower rail main body, a pair-of downward flange portions downwardly extending from inner edges of the inwardly extending flange portions, and a pair of outwardly extending flange portions outwardly extending from downward edges of the downward flange portions, wherein the slit train is provided from the inwardly extending flange portions to the outwardly extending flange portions via the downward flange portions.

21. A powered seat sliding apparatus, according to claim 20, wherein the upper rail is provided with a pair of outwardly folded portions of which ends are set in inner spaces defined in the pair of flanges so as to restrain an internal distance between the pair of flanges from being expanded as an expansion restraining means.

22. A powered seat sliding apparatus, according to claim 1, wherein the upper rail is equipped to the seat and the lower rail is equipped to a base rack.

23. A powered seat sliding apparatus driven by a motor, comprising:
a sliding mechanism having a lower rail and an upper rail movable in a lengthwise direction relative to the lower rail;
a feed screw disposed between the upper rail and the lower rail to be rotated around a rotational axis in the lengthwise direction in response to a rotational force of the motor;
a reduction mechanism for reducing the rotational force of the motor;

a rotary cable for directly transmitting the rotational force reduced by the reduction mechanism to the feed screw;

the rotary cable having an end portion arranged in the lower rail;

wherein the feeding mechanism includes a worm gear as the feed screw and a slit train engaged with the worm gear; and wherein the lower rail is provided with an approximately U-shaped lower rail main body and a flange portion extending from the lower rail main body towards an inner space of the approximately U-shaped lower rail main body, the upper rail is slidably supported in the inner space of the lower rail, the worm gear is fixedly supported in the lengthwise direction by the upper rail so as to be rotated, the slit train is defined at the flange portion, wherein the worm gear is engaged with the slit train.

24. A powered seat sliding apparatus, according to claim 23, wherein the feeding mechanism includes a screw shaft extending in the lengthwise direction as the feed screw and a nut engaged with the screw shaft.

25. A powered seat sliding apparatus, according to claim 23, wherein the slit train is defined in the lengthwise direction at a side portion of the lower rail.

26. A powered seat sliding apparatus driven by a motor, comprising:

a pair of parallel sliding mechanisms having lower rails and upper rails movable in a lengthwise direction relative to the corresponding lower rail, respectively;

a pair of feed screws disposed at each lower rail to be rotated around a rotational axis in the response to a rotational force of the motor, respectively;

a reduction mechanism for reducing the rotational force of the motor; and a rotary cable for directly transmitting the rotational force reduced by the reduction mechanism to at least one of the feed screws; and the rotary cable having an end portion arranged in one of the lower rails;

wherein each feeding mechanism includes a worm gear as the feed screw and a slit train engaged with the worm gear; and wherein the lower rail is provided with an approximately U-shaped lower rail main body and a flange portion extending from the lower rail main body towards an inner space of the approximately U-shaped lower rail main body, the upper rail is slidably supported in the inner space of the lower rail, the worm gear is fixedly supported in the lengthwise direction by the upper rail so as to be rotated, the slit train is defined at the flange portion, wherein the worm gear is engaged with the slit train.

27. A powered seat sliding apparatus, according to claim 26, wherein the feeding mechanism includes a screw shaft extending in the lengthwise direction as the feed screw and a nut engaged with the screw shaft.

28. A powered seat sliding apparatus, according to claim 26, wherein a rotational direction of one of the pair of feed screws is the same as a rotational direction of the other one of the pair of feed screws.

29. A powered seat sliding apparatus, according to claim 26, wherein the slit train is defined in the lengthwise direction at a side portion of the lower rail.

30. A powered seat sliding apparatus, according to claim 1, wherein an end of the rotary cable is connected to the feed screw along an axis of the feed screw.

31. A powered seat sliding apparatus, according to claim 23, wherein an end of the rotary cable is connected to the feed screw along an axis of the feed screw.

32. A powered seat sliding apparatus, according to claim 26, wherein an end of the rotary cable is connected to the feed screw along an axis of the feed screw.

33. A powered seat sliding apparatus, according to claim 1, wherein the rotary cable whose end portion is arranged in the lower rail is a flexible rotary cable.

34. A powered seat sliding apparatus, according to claim 23, wherein the rotary cable whose end portion is arranged in the lower rail is a flexible rotary cable.

35. A powered seat sliding apparatus, according to claim 26, wherein the rotary cable whose end portion is arranged in the lower rail is a flexible cable.

* * * * *